June 13, 1944. C. H. WHITE 2,351,172
TOOL LIFT MECHANISM
Original Filed July 8, 1940 2 Sheets-Sheet 2
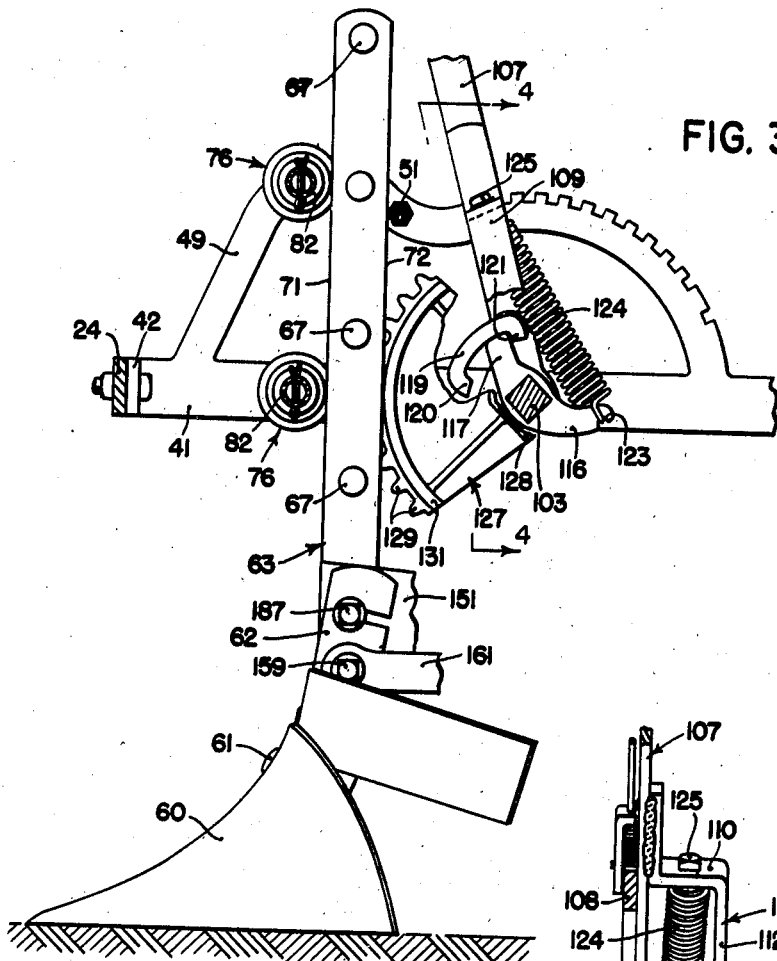
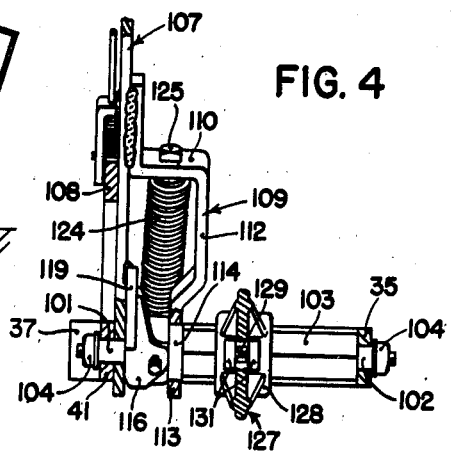
INVENTOR:
CHARLES H. WHITE
BY
ATTORNEYS.

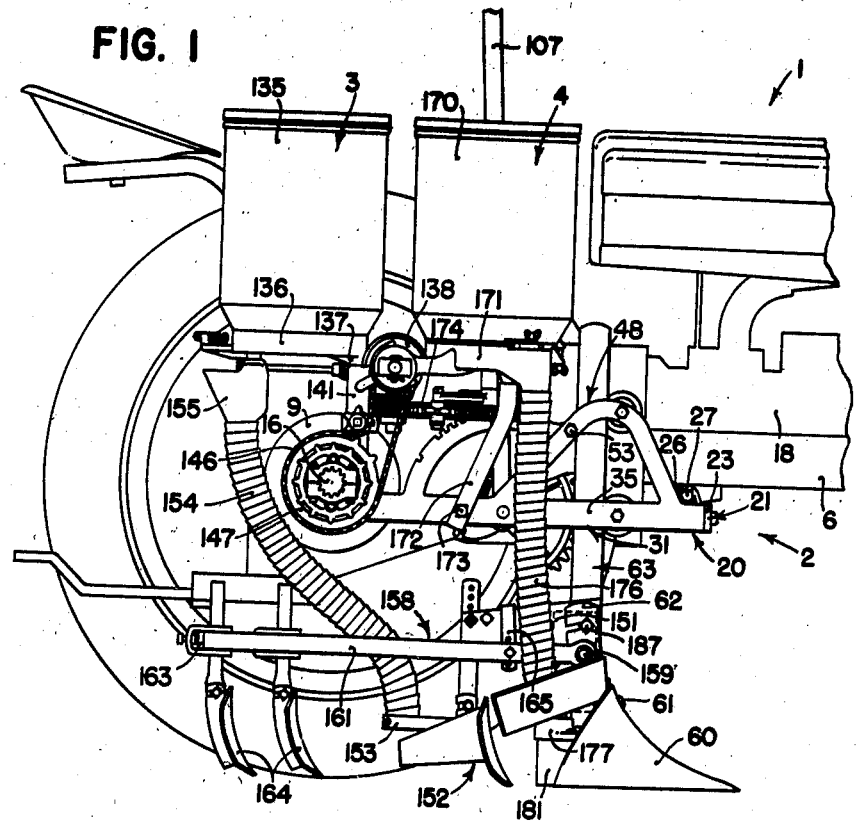

Patented June 13, 1944

2,351,172

UNITED STATES PATENT OFFICE 2,351,172

TOOL LIFT MECHANISM

Charles H. White, Moline, Ill., assignor to Deere & Company, Moline, Ill., a corporation of Illinois Original application July 8, 1940, Serial No. 344,310. Divided and this application November 30, 1942, Serial No. 467,449

11 Claims. (Cl. 97—47)

This application is a division of my co-pending application, Serial No. 344,310, filed July 8, 1940, for Planters, now U. S. Patent No. 2,322,332, issued June 22, 1943.

The present invention relates generally to agricultural machines and is more particularly concerned with a planting implement of the so-called integral type, wherein the tractor serves as the supporting frame for the furrow openers and associated parts.

The object and general nature of the present invention is the provision of an agricultural machine especially adapted to be connected to a tractor and embodying a planter of the integral type having generally vertically shiftable tool beams with means for raising and lowering each tool beam with which is associated spring yielding means permitting the depth adjusting part to be moved into the desired position and stressing the spring means so that the latter acts when the implement moves forwardly to force the tool or tools down into the position determined by the depth adjusting part.

These and other objects and advantages of the present invention will be apparent to those skilled in the art after a consideration of the following detailed description of the preferred structural embodiment, taken in conjunction with the accompanying drawings in which the preferred structural embodiment has been illustrated.

In the drawings:

Figure 1 is a side view of an agricultural machine in which the principles of the present invention have been incorporated;

Figure 2 is a sectional view showing the connections between the hand lever and the sector which raises and lowers the tool beam;

Figure 3 is a view similar to Figure 2 but showing the position of the parts when the hand lever has been moved into an operating position with the machine stationary and the associated ground working tool not yet in its operating position; and Figure 4 is a section taken generally along the line 4—4 of Figure 3, showing the support of the depth adjusting lever on the sector shaft operating arm.

Referring now to the drawings, more particularly to Figures 1 and 2, the present invention is shown as incorporated in an agricultural machine which includes a tractor 1 serving as supporting frame means and a tool carrying implement 2 with which planting and fertilizing units 3 and 4, preferably supported on the tractor 1, are operatively associated.

The tractor 1 is of more or less conventional construction, embodying a frame 6 supported at its forward end on front steering wheels and, at its rear end, connected to or including a rear axle housing which is provided with laterally outwardly extending axle housing sections 9 (Figure 1). Each rear axle section 9 has suitable means by which the units 3 and 4 are connected thereto and supported thereby. Axle shafts 16 are journaled in the axle housing extensions 9 and are arranged to be driven by the tractor motor 18 in the usual way.

The frame of the implement 2 is indicated in its entirety by the reference numeral 20 and includes a transversely disposed cross bar 21, which is preferably of flat stock and having a length such as when the cross bar 21 is disposed transversely of the tractor it extends laterally outwardly beyond the body of the tractor, as indicated at 23 and 24. The cross bar 21 is fixed to the sides of the tractor frame by a pair of clips 26 formed so that one end of each clip may be bolted, as at 27, to a bracket on the tractor and the other end may be bolted, as at 29, to the cross bar.

A pair of draft frames 31 are connected between the ends 23 and 24 of the cross bar 21 and the rear axle housing extensions 9. Each draft frame includes a bar 35 (Figure 1) which at its forward end is bent laterally inwardly and at its rear end is bent, as at 37 (Figure 4), laterally inwardly so as to extend along the associated rear axle housing extension. Each frame also includes a second strap member 41 (Figure 2) which at its forward end is bent, as at 42, and at its rear end 43 is bent so as to extend laterally outwardly alongside the inwardly bent portion of the frame section 37 of the bar 35. The bars 35 and 41, when connected together as described, form a draft frame, and each draft frame forms a rigid connection between the laterally outer end of the cross bar 21 and the rear axle housing.

Welded or otherwise fixed to the draft frame member 35 is an inverted U-shaped bracket 48 (Figure 1), and a companion inverted U-shaped bracket 49 (Figure 2) is secured as by welding or otherwise to the draft frame member 41. The upper portions of the brackets 48 and 49 are maintained in the desired laterally spaced relation by a spacing bolt 51. This bolt is provided with a shoulder 52 and an adjacent threaded end which extends through an aperture in the bracket 49 and receives a nut by which the bracket 49 may be clamped firmly against the shoulder 52. At its other end the spacing bolt 51 is threaded and extends through an aperture in the outer bracket 48. The outer threaded end of the spacing bolt 51 receives a pair of lock nuts, represented by the nut 53 in Figure 1, one on each side of the bracket 48, whereby the spacing between the brackets 48 and 49 may be adjusted or fixed as desired. The draft frames 31 are substantially identical, except that certain parts may be right-hand and other parts may be left-hand, and hence the description of one will suffice. Each draft frame includes suitable guiding and adjusting mechanism for the associated tools which will be described below.

The implement frame 20, which includes the cross bar 21 and two draft frames 31, forms a strong and sturdy support for a variety of tools which may be carried thereby. In order to best illustrate the principles of the present invention, I have shown in the drawings a sweep type cotton and corn planter, in which the ground working tools are sweeps which are mounted on or carried by generally vertically reciprocable tool beams or shanks connected, respectively, with the draft frames 31, described above, but it will be understood that my invention is not limited to tools or implements of the sweep type.

At each side of the tractor 1 a ground working tool, such as a sweep 60, is fastened by a bolt 61 or other suitable means to a pair of conventional friction trip plates 62 pivoted to the lower end of a vertically reciprocable tool shank or tool beam 63 and held in place by a clamping bolt 187. As best shown in Figure 2, each tool beam 63 includes a pair of laterally spaced apart bars 64 and 65 disposed on opposite sides of an intermediate bar 66. Heavy rivets 67, or any other suitable means, may be utilized for fixing the bars 64, 65 and 66 together. It will be noted that the inner bar 66 is more narrow than the outer bars 64 and 65 so that each vertically reciprocable tool beam presents forwardly and rearwardly directed edges, as indicated at 71 and 72, respectively, with a groove or channel therebetween, as indicated at 73 and 74. For guiding each tool beam in its generally vertical movements, each draft frame 31 and 32 carries a pair of forward rollers 76. Each roller 76 includes a central flange 78 and opposite which are bearing shoulders 79 which receive the forward edges 71 of the associated tool beam, as best shown in Figure 2. Each roller 76 is journaled for rotation on an adjusting shaft 82 and is held in position thereon by a pair of collars 83. The collars are held against rotation by pins 84 disposed in suitable openings 85 in the shaft 82. The flange 78 on each of the two rollers associated with each tool beam seat far enough in the channel or groove 73 of the associated tool beam so that the rollers serve to prevent the tool beam from shifting laterally relative to the associated draft frame. The lateral position of the tool beam may be varied by removing the pins 84 and shifting the rollers and collars to a new position, reinserting the pins 84 in other holes in the shafts 82. Each tool beam is held up against the associated rollers 76 by means which will be described below.

Coming now to the features with which this invention is more particularly concerned, each of the draft frames 31 carries means for raising and lowering the associated tool beam 63. According to the present invention, the opposite side bars 35 and 41 of each unit are apertured to receive the rounded end portions 101 and 102 (Figure 4) of a shaft 103, the major portion of which is square in cross section. The rounded or cylindrical portions 101 and 102 project slightly beyond the adjacent surfaces of the draft frame members so that when the nuts 104 are tightened to secure the shaft 103 against lateral displacement, the shaft is nevertheless free to rotate in its bearing support. The cylindrical section 101 is of greater axial extent than the companion cylindrical portion 102 so as to receive the inner apertured end of a hand lever 107. The lever 107 carries the usual detent latch which cooperates with a sector 108 that is fixed to the inner draft frame member 41 and to the inner guide bracket 49.

A brace 109 is fixed at its upper end, as by welding or the like, to the lever 107 above the sector 108 and is formed so as to extend laterally outwardly therefrom, as indicated at 110, and then downwardly alongside the lower end of the lever 107, generally in parallelism therewith, as indicated at 112. This portion terminates in an apertured section 113 which embraces the hub portion 114 of an arm 116, preferably in the form of a casting which is mounted on and secured to the square portion of the shaft 103 so as to form a part thereof. The arm 116 has an abutment extension 117 which lies alongside the lower end of the hand lever 107 and is movable relative thereto between stops which are defined by a bracket 119 provided with downturned ends 120 and 121. Preferably, the bracket 119 is welded to the lever 107. The arm 116 also includes a lug 123 disposed at an angle to the extension 117 and at its outer end receives the lower end of a spring 124, the upper end of which is adjustably connected, as by a bolt 125, to the lateral section 110 of the brace 109. The effect of the spring 124 is to hold the arm 116 and hand lever 107 against relative movement, with the extension 117 of the arm 116 normally against the stop 120. Normally, therefore, when the hand lever 107 is moved forwardly, or in a counterclockwise direction as viewed in Figure 2, the spring tension causes the shaft 103 to move through the same angular distance. When the lever 107 is moved in a clockwise direction, the stop 120 engages directly the arm section 117 so that this movement of the hand lever 107 occasions the same movement of the shaft 103.

The latter mentioned movement is made use of to raise the associated tool bar and the counterclockwise movement of the hand lever 107 and shaft 103 is made use of to lower the tool beam. To this end, a sector casting 127 provided with a square hub 128, is mounted on and clamped firmly to the square shaft 103, and is provided with a set of teeth 129 which are adapted to mesh with teeth 130 formed in the adjacent portion of the rear edge of the intermediate or spacing member 66 of the associated tool beam 63. Also, as best shown in Figure 4, the sector 127 is provided with shoulders 131 on opposite sides of and disposed radially inwardly of the teeth 129. The shoulders 131 are adapted to engage the rear edges 72 of the tool beam members 64 and 65, and from Figures 1 and 2, it will be seen that the sector 127 is disposed substantially directly rearwardly of the lower guide roller 76. The spacing bolt 51 serves to hold the upper end of the tool bar against the upper roller 76 against any tendency for the upper end of the tool beam to move away.

Preferably, the parts are so arranged that the hand lever 107 stands in about the position shown in Figure 2 when the sweeps 60 are at the top surface of the ground. As mentioned above, moving the hand lever 107 rearwardly will raise the associated tool beam into its inoperative position. Moving the hand lever 107 forwardly from the position shown in Figure 2 will force the tool 60 down into the ground, providing the outfit is moving or if the ground is soft enough to permit the tool to be forced directly downwardly. If, however, this is not the case, moving the hand lever 107 forwardly from the position shown in Figure 2 to the position shown in Figure 3 serves only to stretch the spring 124. However, the bias imparted to the spring is exerted continuously against the associated tool beam, with the result that when the outfit does start up or when the stretch or hard ground is passed, the tool 60 will be immediately forced into the ground without further attention on the part of the operator. Thus, the springs 124 serve the very useful purpose of cushioning the tool beams and providing a yielding means for forcing the tools into the ground and permitting them momentarily to rise if it should occur that hard ground is encountered. If there were direct connections between the tool beams and the lifting mechanism, and if a stretch of hard ground or some obstruction to the proper penetration of the tools were encountered, it is not unlikely that some parts might be broken if a yielding cushioning mechanism, such as I have shown and described, is not employed. Thus, in the present implement, the springs 124 serve to protect the teeth 129 and 130 against breakage. Also, the implement may be adjusted for any depth of operation without requiring that the tools be actually forced that far into the ground.

The implement described above is particularly adapted for sweep planters. Accordingly, I prefer to mount on the tractor planting and fertilizing means arranged to deposit seed and fertilizer, and preferably such planting and fertilizing means may be constructed along the lines of the planting and fertilizing means shown in my prior Patent No. 2,210,994, dated August 13, 1940, to which reference may be had if necessary. Briefly, the planting unit at each side of the tractor includes a seed hopper 135 supported on a base or other suitable means, as indicated at 136. The base or support 136 is provided with a pair of arms 137 connected with or forming a part of a gear case 138 which is bolted on the upper laterally inturned ends of a pair of arms 141 which form a part of a bracket secured to the tractor attaching lugs, as suggested in said prior patent. The planter unit base 136 includes seed selecting and feeding mechanism driven by a chain 146 from a sprocket 147 that is detachably mounted on the adjacent axle shaft 16 (Figure 1).

A pair of plates 151 are fixed at their forward ends to the lower portion of each of the tool beams 63 and extend rearwardly therefrom, forming a bracket to which a planter furrow opener 152 is connected. The furrow opener 152 carries a yoke 153 extending rearwardly therefrom to which the lower end of a seed tube 154 is connected, as best shown in Figure 1, the upper end of the seed tube being connected to a funnel 155 which receives seed from the associated hopper 135 under the control of the seed selecting mechanism associated therewith. A covering shovel frame 158 is pivoted, as at 159, to the lower portion of each of the tool beams 63 and comprises a pair of strap members 161 extending rearwardly along opposite sides of the seed tube and receiving a cross bar 163 to which the shanks of covering shovels 164 are fixed. A strap 165 is fixed at its lower ends to the straps 161 and 162 and extends over the upper edge of the plates 151. The yoke 165 serves as a stop limiting the downward swinging movement of the covering frame 158 but permitting upward movement of the covering frame relative to the tool beam 63 and furrow opener 152 associated therewith. Normally, the covering shovel frame 158 floats when the associated tool beam 63 is in its lowered or operating position, but when the tool beam is raised, the covering shovel frame is also raised with it, due to the contact of the yoke 165 with the plates 151.

The machine may be operated simply as a planter, with a planting unit 3 at each side thereof, as described above, but frequently the farmer will desire to distribute fertilizer at the same time that he plants, and to this end I provide a fertilizer attachment 4 for each of the planting attachments 3, as suggested in my prior patent identified above. Briefly, each fertilizing unit includes a fertilizer hopper 170 supported on a frame or base 171 which is, in turn, supported on the gear housing section 138 of the planting unit and on a brace 172 which is bolted at its upper end to the fertilizer hopper bottom 171 and at its lower end to the outer member 35 of the associated draft frame, as indicated at 173. The fertilizer distributing mechanism is driven from the seeding mechanism by a chain 174 and associated parts, along the lines of the mechanism shown in said prior patent. A fertilizer feed tube 176 leads downwardly from the fertilizer hopper base and connects at its lower end to a fertilizer boot 177 (Figure 1) in the form of a collar fastened to a fertilizer opener 181.

The operation of this machine is believed to be apparent from the above description.

Assuming that the machine is standing at the beginning of the rows to be planted, the operator swings both of the hand levers 107 forwardly, stressing the cushioning springs 124 and thereby exerting a bias tending to force both of the sweeps into the ground as soon as the outfit starts up. As will be readily understood, sweep planters are commonly employed where the field has been previously bedded so that at planting time the tools sweep off the tops of the beds and the planting is done on the flat sections immediately behind the sweeps. These ridges or beds sometimes get quite hard, in which case the springs 124 may yield in order to permit the sweeps momentarily to rise over such obstructions, but as soon as softer soil is encountered the springs immediately force the sweeps back to their proper operating level. The planter furrow openers 152 open small furrows in the swept off lands and the seed is deposited therein by the seed selecting mechanism associated with each of the planting units 2. At the same time, the fertilizer is distributed to one side of and above the seed level by the fertilizer furrow openers 181.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural machine comprising means serving as a supporting frame, a ground working tool carried thereby, a member for raising and lowering said tool, means serving as a pair of stops on said member, a second member movable relative to said first member, and resilient means interconnecting said members whereby said first member may be actuated by said second member through said spring means to lower said tool.

2. In an agricultural machine, means serving as a frame, a tool movable with respect to said frame means, a shaft mounted for rocking movement in said frame, a member fixed to said shaft and operatively connected to raise and lower said tool, an abutment member fixed to said shaft adjacent one end thereof, an operating lever mounted for movement relative to said abutment member, spring means acting between said lever and said abutment member whereby movement of said lever in one direction acts through said abutment member and said shaft for lowering said tool, and stop means on said lever cooperating with said abutment member for limiting the movement of the latter and said shaft relative to said lever whereby the setting of the latter determines the normal operating depth of the tool, movement of said lever to carry said stop away from said abutment member acting through said spring to bias said tool for movement into an operating position.

3. In an agricultural implement, a movable tool shank, frame means with respect to which said shank is generally vertically movable, a ground working sweep connected to the lower end of said shank, a member for moving said sweep into lowered position, means serving as a pair of stops on said member, a second member connected with said sweep and movable relative to said first member, said pair of stops cooperating with said second member for limiting relative movement between said members, and resilient means interconnecting said members whereby said first member may be moved into a lowered position while said sweep remains above its corresponding lowered position but is biased to move into its lowered position by said resilient means.

4. In an agricultural implement, a movable tool shank, frame means with respect to which said shank is generally vertically movable, a sector pivoted on said frame means and engageable with said shank to raise and lower the latter, a member movably connected with said frame for swinging said sector, a second member movable relative to said first member, means serving as a pair of stops on said second member cooperating with said first member for limiting relative movement between said members, and resilient means interconnecting said members whereby said first member may be actuated by said second member through said spring means to lower said tool by swinging said sector.

5. An agricultural implement comprising a support, a tool controlling rockshaft pivoted thereon, a hand lever having two spaced apart sections swingable on said rockshaft, an arm fixed to said rockshaft between said sections, stop means carried by said lever between said lever sections and having two spaced abutment portions engageable with a part of said arm for limiting the movement of said lever relative to said arm in both directions, and spring means connecting said arm and lever.

6. An agricultural implement comprising a draft frame having spaced apart members, a rockshaft journaled on said members and including a polygonal section, a tool-controlling member connected with said polygonal section, an arm having a hub portion fixed to said section, a hand lever swingably connected with said hub section, and spring means connecting said arm and lever.

7. An agricultural implement comprising a draft frame having spaced apart apertured members, a rockshaft having cylindrical ends journaled in the apertures of said members and a central polygonal section, a tool-controlling member connected with said polygonal section, an arm having a hub portion fixed to said section, a hand lever having one part journaled on said hub and the other part journaled on one of the cylindrical ends of said rockshaft, said parts embracing said arm, and spring means connecting said arm and lever.

8. In an agricultural implement having a part to be moved, a rockshaft, means connecting the rockshaft with said part, an arm on the rockshaft having two extensions, a lever rockably mounted on said rockshaft, means including a pair of spaced apart abutments carried by said lever and disposed on opposite sides of one of said arm extensions, and spring means connecting the other arm extension with said lever.

9. In an agricultural implement having a part to be moved, a rockshaft, means connecting the rockshaft with said part, an arm on the rockshaft, a lever rockably mounted on said rockshaft, spring means connecting said arm and spring means whereby the latter transmits a moving force from said lever to said rockshaft, and stop means acting between said arm and lever after the spring means has been deflected a given amount for transmitting movement to said rockshaft from said lever independently of said spring means.

10. In an agricultural implement, a movable tool shank, frame means with respect to which said shank is generally vertically movable, a ground working sweep connected to the lower end of said shank, a member for moving said sweep into lowered position, a second member connected with said sweep and movable relative to said first member, resilient means interconnecting said members whereby said first member may be moved into a lowered position while said sweep remains above its corresponding lowered position but is biased to move into its lowered position by said resilient means, and stop means limiting the relative movement between said members in the direction that stresses said resilient means whereby, after a given amount of relative movement between said members has occurred, movement of said first member causes positive displacement of said second member.

11. In an agricultural implement, a movable tool shank, frame means with respect to which said shank is generally vertically movable, a sector pivoted on said frame means and engageable with said shank to raise and lower the latter, a member movably connected with said frame for swinging said sector, a second member movable relative to said first member, and resilient means interconnecting said members whereby said first member may be actuated by said second member through said spring means to lower said tool by swinging said sector.

CHARLES H. WHITE.